(12) United States Patent
Eshet et al.

(10) Patent No.: US 11,147,382 B2
(45) Date of Patent: Oct. 19, 2021

(54) AUXILIARY ARMREST FOR SEATS

(71) Applicants: Yuval Eshet, Kfar Vradim (IL); Eric McGee, Myrtle Beach, SC (US); Adi Eshet, Tetonia, ID (US)

(72) Inventors: Yuval Eshet, Kfar Vradim (IL); Eric McGee, Myrtle Beach, SC (US); Adi Eshet, Tetonia, ID (US)

(*) Notice: Subject to any disclaimer, the term of this patent is extended or adjusted under 35 U.S.C. 154(b) by 0 days.

(21) Appl. No.: 16/379,254

(22) Filed: Apr. 9, 2019

(65) Prior Publication Data
US 2019/0307252 A1    Oct. 10, 2019

Related U.S. Application Data

(60) Provisional application No. 62/654,559, filed on Apr. 9, 2018.

(30) Foreign Application Priority Data

Aug. 30, 2018 (CN) .......................... 201821413245.7

(51) Int. Cl.
 *A47C 7/54* (2006.01)
 *A47C 11/00* (2006.01)
 *B60N 2/75* (2018.01)
 *B64D 11/06* (2006.01)

(52) U.S. Cl.
CPC ............ *A47C 7/543* (2013.01); *A47C 11/005* (2013.01); *B60N 2/787* (2018.02); *B64D 11/0644* (2014.12); *B64D 11/0646* (2014.12)

(58) Field of Classification Search
CPC ....... A47C 7/543; A47C 7/546; A47C 11/005; B64D 11/0644; B64D 11/0646; B60N 2/787
USPC ......................................................... 297/232
See application file for complete search history.

(56) References Cited

U.S. PATENT DOCUMENTS

| | | | | |
|---|---|---|---|---|
| 3,121,591 A * | 2/1964 | Micciche | ................. | A47C 7/68 297/153 |
| 3,475,052 A * | 10/1969 | Kaposi | ................... | A47B 23/02 297/153 |
| 6,736,455 B1 * | 5/2004 | Zakovic | ............... | B60N 2/2839 297/256.15 |
| 6,773,060 B2 * | 8/2004 | Sher | .................... | A47B 21/0314 248/918 |
| 6,957,462 B1 * | 10/2005 | Wilcox | .................. | A47C 7/383 297/393 |
| 10,232,815 B1 * | 3/2019 | Dry | ....................... | B60R 21/207 |
| 2009/0224577 A1 * | 9/2009 | Chen | ..................... | A47C 4/286 297/153 |

* cited by examiner

*Primary Examiner* — Mark R Wendell
(74) *Attorney, Agent, or Firm* — William Dippert; Laurence Greenberg; Werner Stemer (57) ABSTRACT

An auxiliary armrest is designed to be supported between two adjacent armrests of a seat in a seat row. The auxiliary armrest comprises an elongated body having two sides, and connectors on said two sides, wherein the connectors are configured to be reversibly connected to the adjacent armrests while the elongated body is between them.

10 Claims, 6 Drawing Sheets

AUXILIARY ARMREST FOR SEATS

CROSS-REFERENCE TO RELATED APPLICATION

This application claims priority to U.S. Provisional Patent Application Ser. No. 62/654,559, filed on Apr. 9, 2018, and to Chinese Utility Model No. 201821413245.7, filed on Aug. 30, 2018, the entire contents of which are incorporated herein by reference in its entirety.

FIELD OF THE INVENTION

The disclosed subject matter relates to armrests. More particularly, the disclosed subject matter relates to a portable armrest for aircraft seats.

BACKGROUND OF THE INVENTION

Commercial aircraft have been constantly evolving in recent decades, attaining very large sizes and ever longer flight ranges. As this happens, passengers find themselves trapped in airplane passenger cabins for many hours at a time, trying to relax in a seat with limited width and shared hand rests. A common comfort feature with which a majority of aircraft seats are equipped is a supportive armrest. Specifically, armrests are generally disposed on opposite sides of an aircraft seat in order to allow a passenger to rest his arms supportably thereon, and in some instances, to provide some separation between adjacent aircraft seats, which may be spaced very closely together.

Since in any arrangement, at least one of the armrests (and both for middle seats) is shared between two passengers, the question of "to whom the armrest belongs" can lead to discomfort, inconvenience, and bad travel experience, and therefore a solution for overcoming this problem is required.

U.S. 2009/0315381 teaches an auxiliary armrest for aircraft that is placed along the armrest enlarging the width of the original armrest and possibly its height.

U.S. Pat. No. 4,920,896 describes a portable arm cushion for tables providing a comfortable support for a person forearm.

Other solutions exist for supporting head and neck while seating for long period of time such as U.S. Pat. No. 6,457,195 that describes a pillow and method of using the same providing comfortable lateral, fore and aft support for an individual's head and neck while the individual rests in a seated, prone or supine position. However, the purpose and methodology of the above prior art does not overcome the sharing problem exist in a joined aircraft armrest nor suggesting a better way for supporting the forearms during seating in a multiple seat per row arrangement common in aircrafts.

BRIEF SUMMARY

According to a first aspect of the present disclosed subject matter, an auxiliary armrest designed to be supported between two adjacent armrests of a seat in a seat row, the auxiliary armrest comprising:
  an elongated body having two sides, and
  connectors on said two sides
wherein the connectors are configured to be reversibly connected to the adjacent armrests while the elongated body is between them.

In some exemplary embodiments, each of the connectors comprises a strap that correspond to a band having a connection therebetween.

The connection is selected from a group of connections consisting of Velcro connection, Zipper, and female/male connector.

In some exemplary embodiments, the elongated body has two openings, each on one of the two sides wherein the seat armrest can be threaded into the opening.

In some exemplary embodiments, each connector of the connectors comprises: a sleeve having a strap, and bands connected beneath the auxiliary armrest wherein the strap corresponds to the band so as to establish a connection therebetween.

In some exemplary embodiments, the connection is selected from a group of connections consisting of Velcro connection, Zipper, and female/male connector.

In some exemplary embodiments, the sleeves are configured to be threaded onto the seat armrest.

In some exemplary embodiments, the connector comprises U-shaped accessory with a fasten screw.

In some exemplary embodiments, the auxiliary armrest is inflatable.

According to another aspect of the present disclosed subject matter, it is provided an inflatable auxiliary armrest designed to be supported between two adjacent armrests of a seat in a seat row, the inflatable auxiliary armrest comprising:
  an elongated body having an inflated state and an uninflated state wherein the body has two opposite sides, and
  connectors on said opposite two sides
wherein the connectors are configured to be reversible connected to the adjacent armrests while the inflatable elongated body is positioned between them.

In some exemplary embodiments, the connectors are openings through which the armrests can be threaded.

Unless otherwise defined, all technical and scientific terms used herein have the same meaning as commonly understood by one of ordinary skill in the art to which this disclosed subject matter belongs. Although methods and materials similar or equivalent to those described herein can be used in the practice or testing of the present disclosed subject matter, suitable methods and materials are described below. In case of conflict, the specification, including definitions, will control. In addition, the materials, methods, and examples are illustrative only and not intended to be limiting.

BRIEF DESCRIPTION OF THE DRAWINGS

Some embodiments of the disclosed subject matter described, by way of example only, with reference to the accompanying drawings. With specific reference now to the drawings in detail, it is stressed that the particulars shown are by way of example and for purposes of illustrative discussion of the preferred embodiments of the present disclosed subject matter only, and are presented in the cause of providing what is believed to be the most useful and readily understood description of the principles and conceptual aspects of the disclosed subject matter. In this regard, no attempt is made to show structural details of the disclosed subject matter in more detail than is necessary for a fundamental understanding of the disclosed subject matter, the description taken with the drawings making apparent to those skilled in the art how the several forms of the disclosed subject matter may be embodied in practice.

In the drawings.

DETAILED DESCRIPTION

Before explaining at least one embodiment of the disclosed subject matter in detail, it is to be understood that the disclosed subject matter is not limited in its application to the details of construction and the arrangement of the components set forth in the following description or illustrated in the drawings. The disclosed subject matter is capable of other embodiments or of being practiced or carried out in various ways. Also, it is to be understood that the phraseology and terminology employed herein is for the purpose of description and should not be regarded as limiting. The drawings are generally not to scale. For clarity, non-essential elements were omitted from some of the drawings.

The terms "comprises", "comprising", "includes", "including", and "having" together with their conjugates mean "including but not limited to." The term "consisting of" has the same meaning as "including and limited to."

The term "consisting essentially of" means that the composition, method or structure may include additional ingredients, steps and/or parts, but only if the additional ingredients, steps and/or parts do not materially alter the basic and novel characteristics of the claimed composition, method, or structure.

As used herein, the singular form "a", "an", and "the" include plural references unless the context clearly dictates otherwise. For example, the term "a compound" or "at least one compound" may include a plurality of compounds, including mixtures thereof.

Throughout this application, various embodiments of this disclosed subject matter may be presented in a range format. It should be understood that the description in range format is merely for convenience and brevity and should not be construed as an inflexible limitation on the scope of the disclosed subject matter. Accordingly, the description of a range should be considered to have specifically disclosed all the possible sub-ranges as well as individual numerical values within that range.

It is appreciated that certain features of the disclosed subject matter, which are, for clarity, described in the context of separate embodiments, may also be provided in combination in a single embodiment. Conversely, various features of the disclosed subject matter, which are, for brevity, described in the context of a single embodiment, may also be provided separately or in any suitable sub-combination or as suitable in any other described embodiment of the disclosed subject matter. Certain features described in the context of various embodiments are not to be considered essential features of those embodiments, unless the embodiment is inoperative without those elements.

An auxiliary armrest is disclosed in this application that is designed to be supported between two adjacent armrests of a seat in a seat row. The auxiliary armrest comprises an elongated body having two sides, and connectors provided on both sides. The connectors are configured to be reversibly connected to the adjacent armrests while the elongated body is between them. A user that seats in a seat can support his arms on the auxiliary armrest without disturbances from people that seats besides him on adjacent seats.

Figure 1:
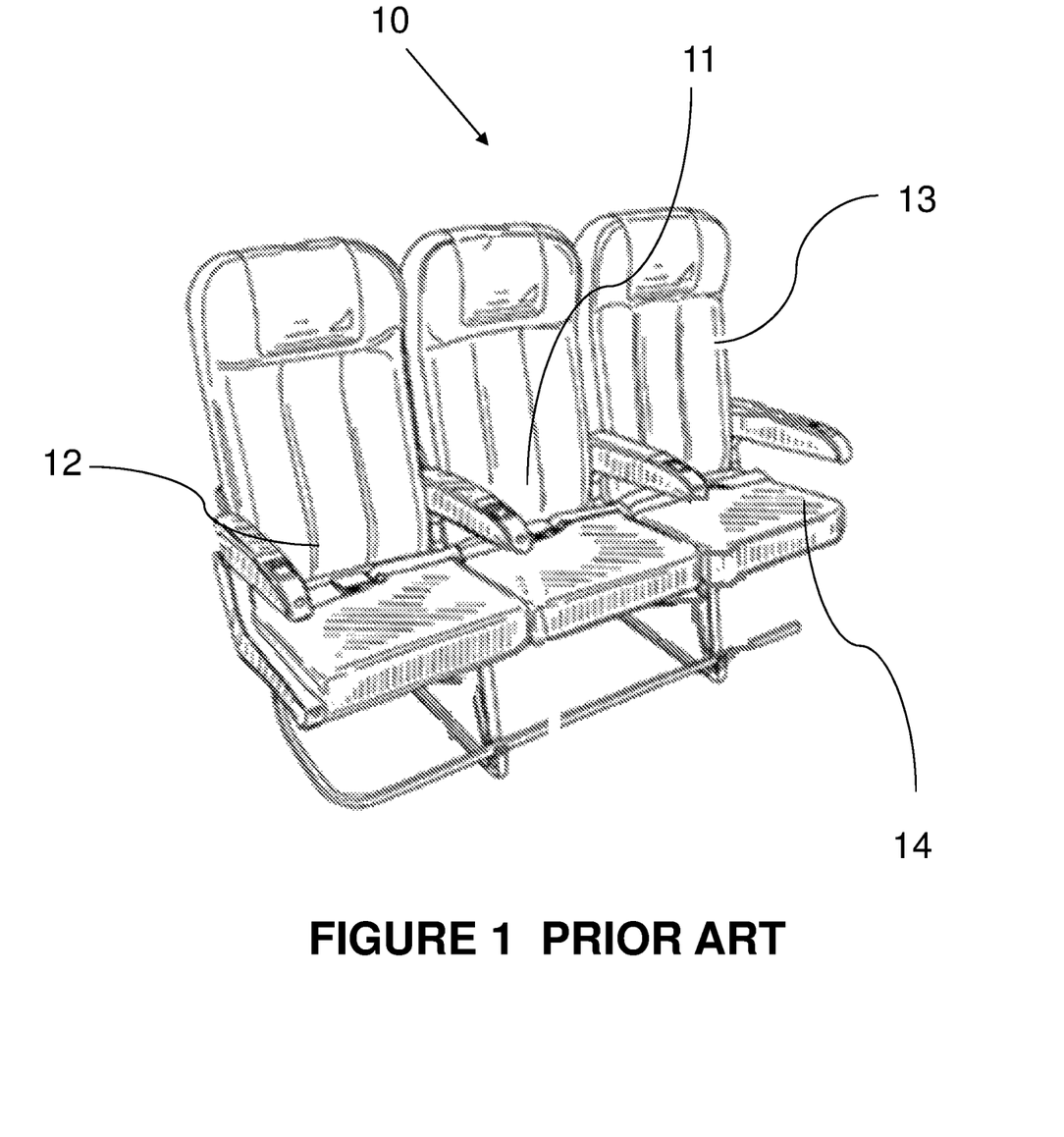
FIG. 1 schematically illustrates a general arrangement of seats in an aircraft (prior art).

Referring now to FIG. 1 schematically illustrating a general seats arrangement in an aircraft (prior art). In the current arrangement of the aircraft seats, regardless if it is 2, 3, and even 4 seats 13 in a row 10, at least one armrest 11 is virtually divided between the two passengers seating on seats 12 next to each other. Moreover, in cases of 3, 4, and more seats in a row, the passenger seating in the middle of the row will have to share both his left and right armrest with the passenger sitting next to him, a fact that can create both physically and mentally concerns.

In many cases, the motivation for enlarging the width of the seat is enforcing a design of a very narrow armrest that have very little room for even one passenger arm only.

The aircraft auxiliary armrest may comprise a frame component, a cushion member formed above the frame component, and an optional layer of a protective or decorative cover overlaying at least the cushion member.

The frame component is structured based on the general standard measurements of the seat armrest distance so that it can be fixed to the majority of armrests in such a fashion that it gets adjusted to the seat armrests distance and does not slip or slither thereby offering the maximum comfort to the passenger.

Figure 2A:
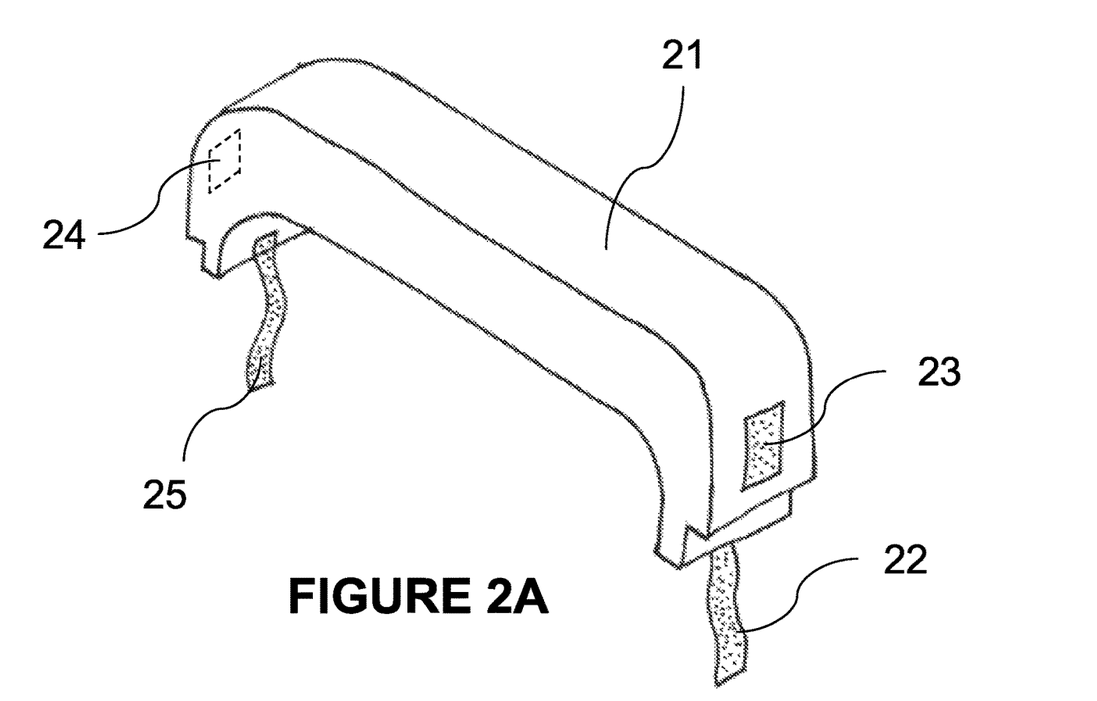
FIG. 2A illustrates a general structure of an auxiliary armrest in accordance with an exemplary embodiment.

Reference is now made to FIG. 2A depicting a general structure of an auxiliary armrest in accordance with an exemplary embodiment. An auxiliary armrest 21 comprises an elongated body that is adapted to be connected between two armrests in front of the passenger in which flexible Velcro straps 22 and 25 are provided on both sides and used to fasten the auxiliary armrest to a seat armrest by means of looping the seat armrests, as an example. The Velcro straps are combined from two parts, a right strap 22 and a left strap, 25 each having an opposite band 23 and 24 attached to the sides of the auxiliary armrest. Band 23 is used to fasten flexible strap 22 and band 24 is used to fasten flexible strap 25. The right flexible strap 22 and the left flexible strap 25 are designed to loop a variety of seat armrests with various shapes and contours by means of extended area of the strap.

It should be mentioned that any other connection mechanism can be employed in order to connect the straps to the bands such as female/male connectors, zipper, multiple times adhesive, etc., without limiting the scope of the disclosed subject matter. The use of Velcro is provided solely as an example.

Figure 2B:
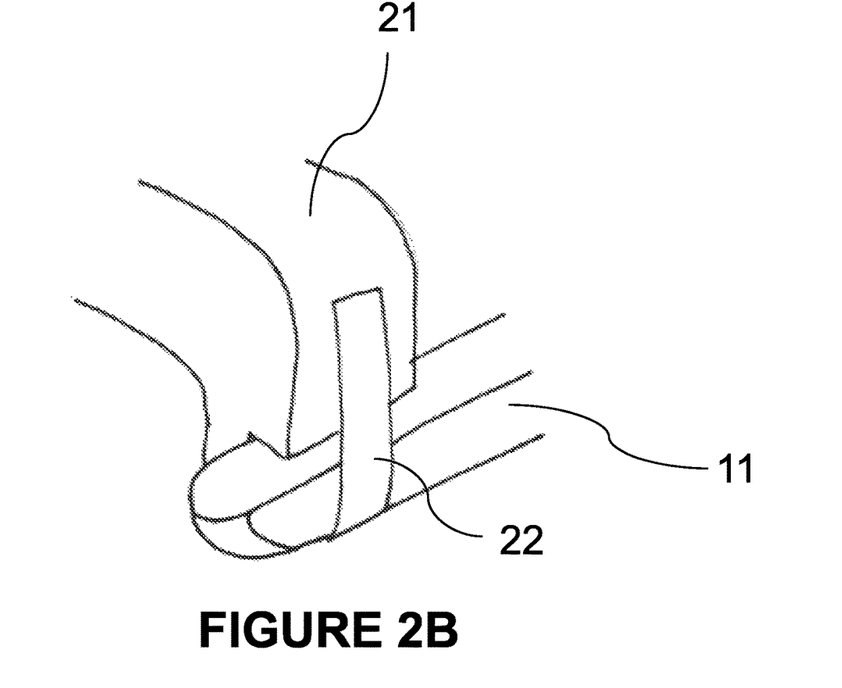
FIG. 2B illustrates a general structure of the auxiliary armrest of FIG. 2A fastened to an armrest.

Reference is now made to FIG. 2B depicting a general structure of the auxiliary armrest of FIG. 2A fastened to an armrest. The auxiliary armrest 21 is shown to be connected to the seat armrest by Velcro straps that are looped about the corresponding part of seat armrest 11. The auxiliary armrest can be positioned along the seat armrest in a positioning that is mostly convenient to the user.

The distance of the auxiliary armrest with respect to the passenger can be adjusted since it can be moved forwards and backwards in respect with the passenger's body.

Figure 3A:
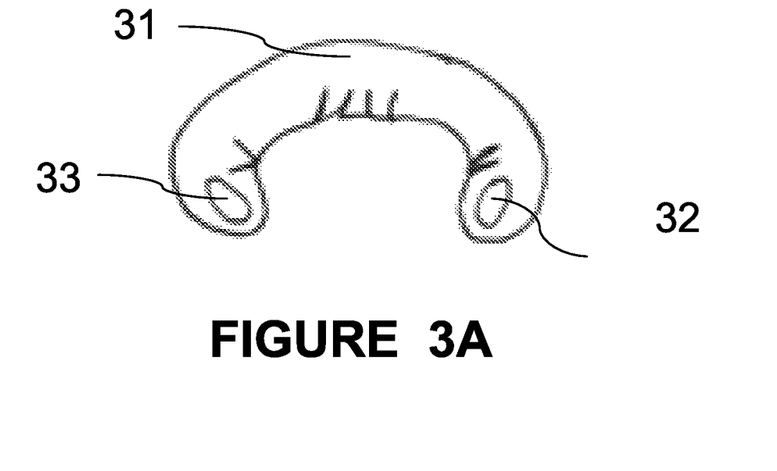
FIG. 3A illustrates a view of an inflatable auxiliary armrest in accordance with another exemplary embodiment, in its initial inflating state.

Reference is now made to FIG. 3A illustrating a view of an inflatable auxiliary armrest in accordance with another exemplary embodiment, in its initial inflating state. An inflatable auxiliary armrest 31 body is designed to be placed between any two armrests of a seat. The auxiliary armrest is partially inflated. The auxiliary armrest has two openings in the right side 32 and in the left side 33. Each opening is designed to allow the aircraft armrest seat end to be threaded within the openings.

Figure 3B:
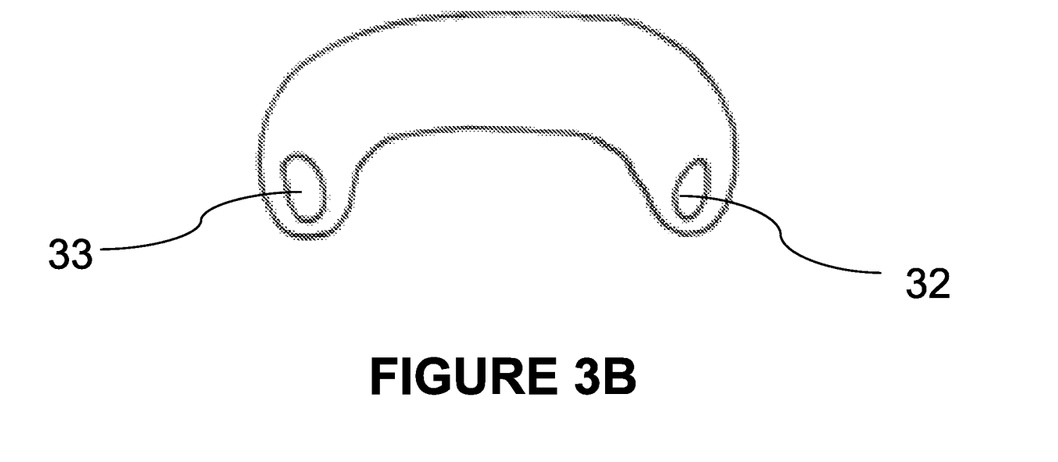
FIG. 3B illustrates a view of the inflatable auxiliary armrest of FIG. 3A, in its full inflating state.

Reference is now made to FIG. 3B illustrating a view of the inflatable auxiliary armrest of FIG. 3A, in its full inflating state. The inflatable auxiliary armrest 31 is designed to be placed between any two armrests of a seat. The auxiliary armrest is fully inflated and has two openings in the right side 32 and in the left side 33. Each opening is designed to match the end of the armrest seat. The right opening 32 is threaded up to the right armrest of the seat and the left opening 33 is threaded to the left armrest of the seat. The inflatable auxiliary armrest can be stored in a purse or a hand bag while its un inflatable state.

Figure 4A:
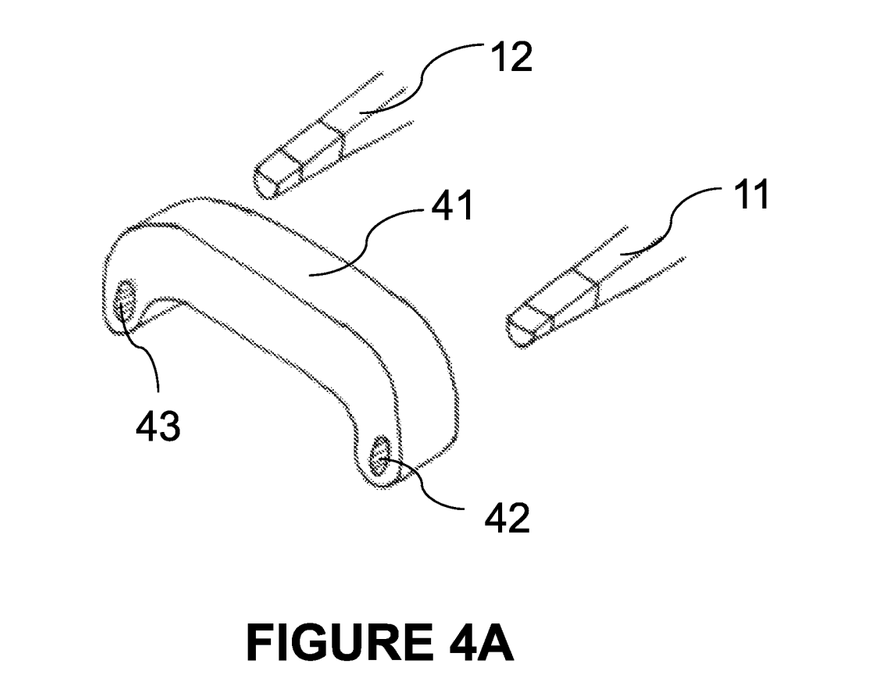
FIG. 4A illustrates a view of an auxiliary armrest in accordance with another exemplary embodiment.

Reference is now made to FIG. 4A illustrating a view of an auxiliary armrest in accordance with another exemplary embodiment. An elongated auxiliary armrest 41 is designed to be placed between any two armrests 11, 12 of a seat (the seat is not shown in the figure). The auxiliary armrest has two openings in the right side 42 and in the left side 43. Each opening is designed to allow the armrest seat end to be threaded within the openings.

Figure 4B:
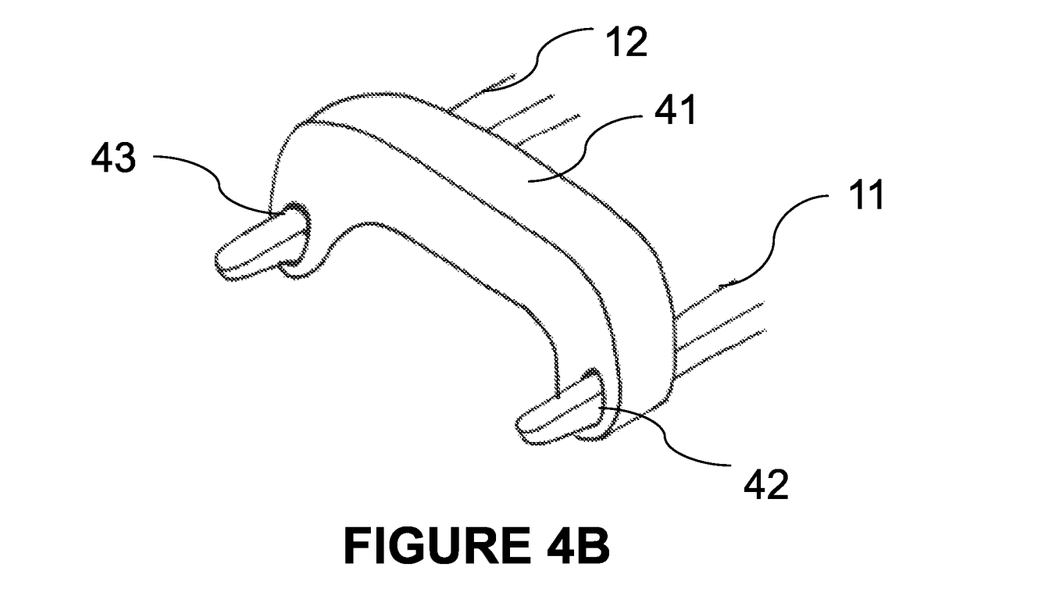
FIG. 4B illustrates a view of the auxiliary armrest of FIG. 4A, positioned between two seats armrest.

Reference is now made to FIG. 4B illustrating a view of auxiliary armrest of FIG. 4A placed between two armrests of a seat. The auxiliary armrest 41 is designed to be placed between any two armrests of a seat. The auxiliary armrest having two openings in the right side 42 and in the left side 43. Each opening is designed to match the end of the armrest seat. The right opening 42 is threaded up to the right armrest 11 of the seat and the left opening 43 is threaded to the left armrest 12 of the seat.

Figure 5A:
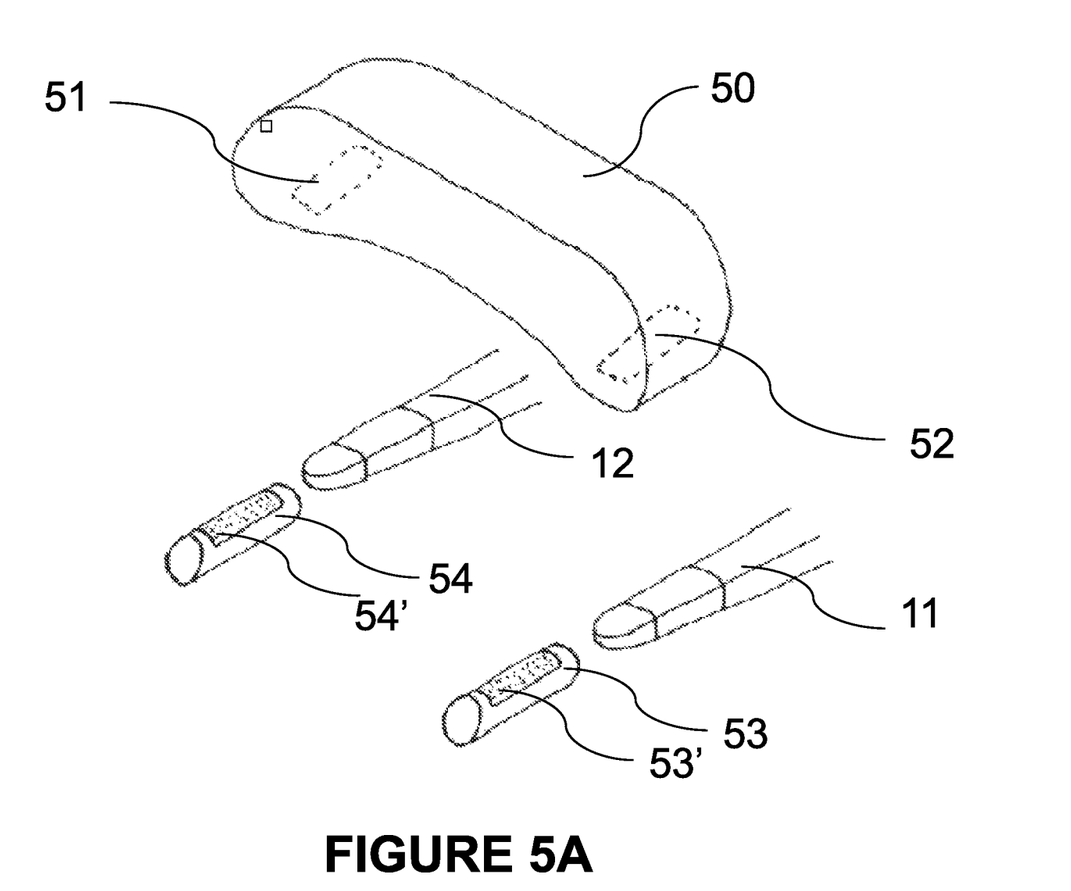
FIG. 5A illustrates a view of an auxiliary armrest in accordance with another exemplary embodiment.

Reference is now made to FIG. 5A illustrating a view of an auxiliary armrest in accordance with another exemplary embodiment. An elongated auxiliary armrest 50 is designed to be placed between any two armrests of a seat. The auxiliary armrest has two Velcro bands. A right band 52 attached to the right bottom side of the auxiliary armrest and a left band 51 attached to the bottom left side of the auxiliary armrest.

A right sleeve 53 with a Velcro strap 53' attached along the sleeve on its upper side and a left sleeve 54 with a Velcro strap 54' attached along the sleeve on its upper side. The right sleeve 53 is designed to be threaded up to the right armrest 11 of the seat and the left sleeve 54 is designed to be threaded to the left armrest 12 of the seat.

Figure 5B:
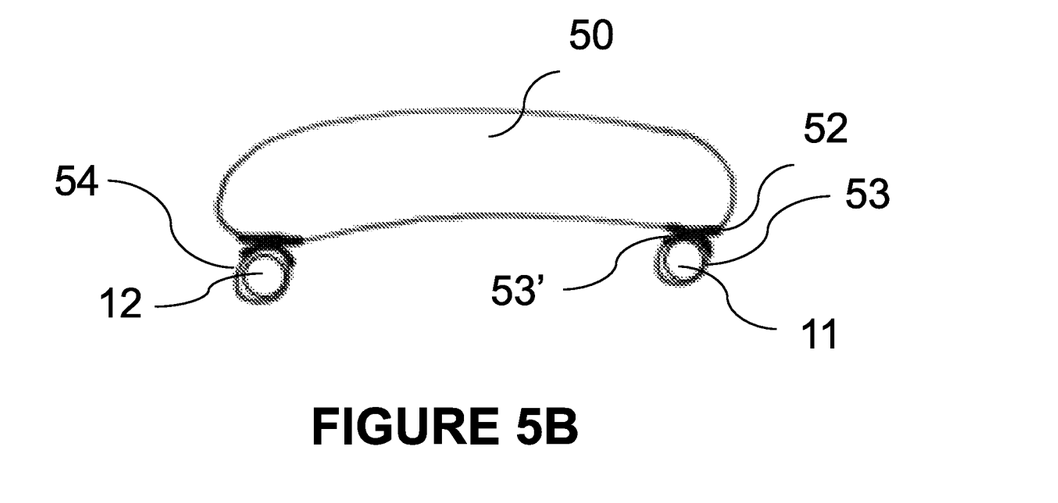
FIG. 5B illustrates a view of the auxiliary armrest of FIG. 5A, positioned between two seats armrest.

Reference is now made to FIG. 5B illustrating a view of auxiliary armrest of FIG. 5A placed between two armrests of a seat. The auxiliary armrest 50 is designed to be placed between any two armrests of a seat. The auxiliary armrest having two bands in the right side 52 and in the left side 51. Each band is designed to match the strap attached to a sleeve threaded on the seat armrest. The right band 52 is fastened to the right strap 53' attached to the right sleeve 53 which is threaded up to the right armrest 11 of the seat. In the same manner, the left band 51 is fastened to the left strap 54' attached to the left sleeve 54 which is threaded up to the left armrest 12 of the seat.

It should be mentioned that any other connection mechanism can be employed in order to connect the straps to the bands such as female/male connectors, zipper, multiple times adhesive, etc. The use of Velcro is provided as an example and by no means limits the scope of the subject matter.

It should also be mentioned that the use of the word sleeve can refer to any other configuration that can be threaded or sleeved or enveloped over the seat armrest.

Figure 6:
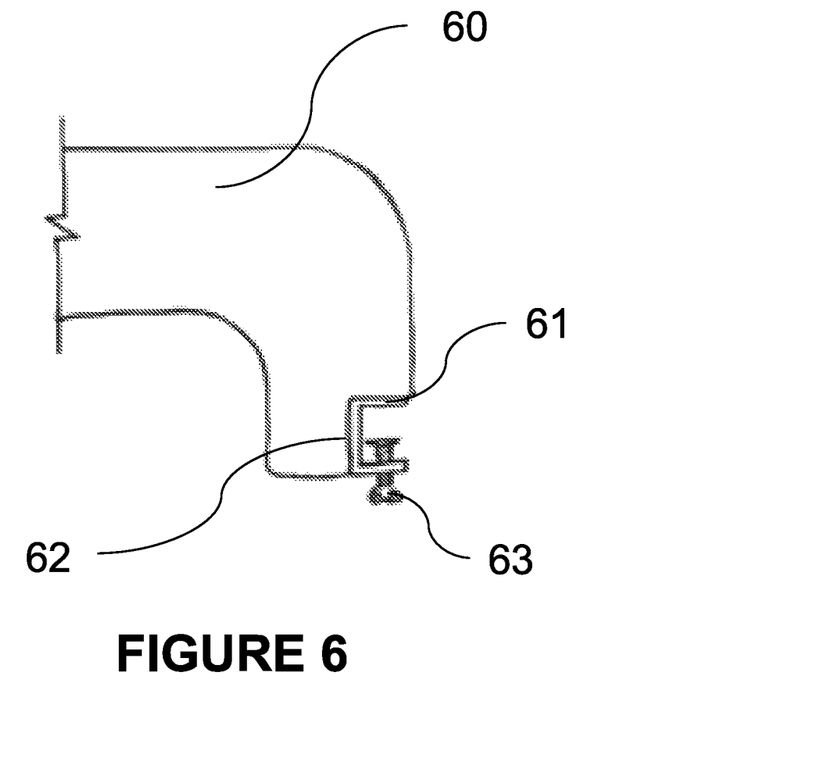
FIG. 6 illustrates a view of an auxiliary armrest in accordance with another exemplary embodiment

Reference is now made to FIG. 6 illustrating a view of an auxiliary armrest in accordance with another exemplary embodiment. An elongated auxiliary armrest 60 is designed to be placed between any two armrests of a seat. The auxiliary armrest preferably has a U shape accessory 61 and a fasten screw 63 located in a niche. The elongated auxiliary armrest 60 has two niches located at its bottom side. The niche located at the right side 62 and the niche located at the left side. The U shape accessory with a fasten screw 61 is placed inside the niche 62 located at the bottom side of the auxiliary armrest. The U-shaped accessory with a wing screw 63 is placed inside the niche 62 located at the bottom side of the auxiliary armrest. An end of a seat armrest is placed within the niche 62 and fastened to provide an auxiliary armrest.

The auxiliary armrest, although depicted herein in the disclosure as adapted for aircrafts seats, can be also employed with other seats placed in a row.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims. All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention.

What is claimed is:

1. An aircraft auxiliary armrest designed to be supported between two adjacent armrests of a seat in a seat row of an aircraft, the aircraft auxiliary armrest comprising:
   a fully inflatable portable elongated body having two oppositely positioned lateral sides and having an inflated state and an uninflated state,
   wherein the elongated body has a first end and a second opposite end,
   wherein each of the first end and the second end has a first opening in one lateral side that is in fluid communication with a second opening in an oppositely positioned lateral side to receive a seat armrest, and
   wherein each opening is substantially parallel with a length of the elongated body, and
   wherein the aircraft auxiliary armrest can be stored in a purse or a hand bag while in the uninflated state.

2. The auxiliary armrest according to claim 1, wherein each opening is designed to allow a seat armrest end to be threaded through.

3. The auxiliary armrest according to claim 1, wherein the connectors comprise a U-shaped accessory with a fasten screw.

4. An aircraft auxiliary armrest designed to be supported between two adjacent armrests of a seat in a seat row of an aircraft, the aircraft auxiliary armrest comprising:
- a fully inflatable portable elongated body having an inflated state and an uninflated state,
- wherein the elongated body has a first end and a second opposite end, and connectors attached to and extending from the first end and the second opposite end, and
- wherein the connectors are configured to be removably connected to the adjacent armrests of the seat of the aircraft while the elongated body is between the adjacent armrests, and wherein the aircraft auxiliary armrest can be stored in a purse or a hand bag while in the uninflated state.

5. The auxiliary armrest according to claim 4, wherein each of the connectors comprises a strap that corresponds to a band having a connection therebetween.

6. The auxiliary armrest according to claim 5, wherein the connection is selected from the group of connections consisting of hook and loop connection, zipper, and female/male connector.

7. The auxiliary armrest according to claim 4, wherein each connector of the connectors comprises a sleeve having a strap and bands connected beneath the auxiliary armrest, wherein the strap corresponds to the band to establish a connection therebetween.

8. The auxiliary armrest according to claim 7, wherein the connection is selected from the group of connections consisting of hook and loop connection, zipper, and female/male connector.

9. The auxiliary armrest according to claim 7, wherein the sleeves are configured to be slid onto the seat armrest.

10. An aircraft auxiliary armrest designed to be supported between two adjacent armrests of a seat in a seat row of an aircraft, the aircraft auxiliary armrest comprising:
- a fully inflatable portable elongated body having two oppositely positioned lateral sides and having an inflated state and an uninflated state,
- wherein the elongated body has a first end and a second opposite end,
- wherein each of the first end and the second end has a first opening in one lateral side that is in fluid communication with a second opening in an oppositely positioned lateral side to receive a seat armrest, and
- wherein each opening is substantially parallel with a length of the elongated body, and
- wherein each opening is designed to allow a seat armrest end to be threaded through, and
- wherein the aircraft auxiliary armrest can be stored in a purse or a hand bag while in the uninflatable uninflated state.

* * * * *